United States Patent [19]
Taylor et al.

[11] Patent Number: 6,051,158
[45] Date of Patent: Apr. 18, 2000

[54] TREATMENT OF AIRBAG INFLATION GASES

[75] Inventors: Robert D. Taylor, Hyrum; Michael W. Barnes, Brigham City; Ivan V. Mendenhall, Providence, all of Utah

[73] Assignee: Autoliv ASP, Inc., Ogden, Utah

[21] Appl. No.: 09/124,868

[22] Filed: Jul. 30, 1998

[51] Int. Cl.⁷ .............................. C09K 5/02; B60R 21/16
[52] U.S. Cl. .................... 252/67; 165/104.21; 252/70; 264/122; 264/211; 280/728.1
[58] Field of Search ..................... 252/67, 70; 264/122, 264/211; 75/303, 304; 280/728.1; 165/104.21

[56] References Cited

U.S. PATENT DOCUMENTS

| | | | |
|---|---|---|---|
| 2,259,846 | 10/1941 | Vernet et al. | 252/67 |
| 3,273,332 | 9/1966 | Poudrier . | |
| 3,305,319 | 2/1967 | Kowalick et al. . | |
| 3,515,518 | 6/1970 | Halstead et al. . | |
| 3,647,393 | 3/1972 | Leising et al. . | |
| 3,692,495 | 9/1972 | Schneiter et al. . | |
| 3,733,180 | 5/1973 | Heineck et al. . | |
| 3,773,351 | 11/1973 | Catanzarite . | |
| 3,778,084 | 12/1973 | Sutherland et al. . | |
| 3,785,149 | 1/1974 | Timmerman | 60/205 |
| 3,834,456 | 9/1974 | Clarke et al. | 252/67 X |
| 3,862,846 | 1/1975 | Timmerman et al. | 149/21 |
| 3,897,285 | 7/1975 | Hamilton et al. | 149/41 |
| 3,901,747 | 8/1975 | Garner | 149/42 |
| 3,902,934 | 9/1975 | Timmerman | 149/83 |
| 3,934,984 | 1/1976 | Marlow et al. . | |
| 3,950,263 | 4/1976 | Fukuma et al. | 252/193 |
| 3,958,949 | 5/1976 | Plantif et al. . | |
| 3,964,225 | 6/1976 | Catanzarite | 60/205 |
| 3,986,456 | 10/1976 | Doin et al. . | |
| 4,066,415 | 1/1978 | Kasama et al. . | |
| 4,152,899 | 5/1979 | Herrick | 62/4 |
| 4,208,207 | 6/1980 | El Gammal | 75/303 X |
| 4,244,758 | 1/1981 | Garner et al. | 149/7 |
| 4,246,051 | 1/1981 | Garner et al. | 149/7 |
| 4,291,755 | 9/1981 | Minto | 165/3 |
| 4,305,908 | 12/1981 | Anisimov et al. | 422/164 |
| 4,403,643 | 9/1983 | Minto . | |
| 4,461,339 | 7/1984 | Sizmann . | |
| 4,484,617 | 11/1984 | Sizmann . | |
| 4,698,107 | 10/1987 | Goetz et al. | 149/7 |
| 4,718,242 | 1/1988 | Yamauchi et al. | 62/467 |
| 4,752,310 | 6/1988 | Maier-Laxhuber et al. | 62/4 |
| 4,789,562 | 12/1988 | Stiffler | 427/221 |
| 4,806,180 | 2/1989 | Goetz et al. | 149/5 |
| 4,930,319 | 6/1990 | Bee et al. | 62/69 |
| 5,261,241 | 11/1993 | Kitahara et al. | 62/4 |
| 5,397,379 | 3/1995 | Barker et al. | 75/303 X |
| 5,620,205 | 4/1997 | Lauritzen et al. | 280/741 |
| 5,682,013 | 10/1997 | Smith et al. | 149/6 |

FOREIGN PATENT DOCUMENTS 3-143984  6/1991  Japan ....................... 252/67

*Primary Examiner*—Richard D. Lovering
*Attorney, Agent, or Firm*—Sally J. Brown

[57] ABSTRACT

Chemical coolant formulations for treating the hot gas formed by an airbag inflator and corresponding methods of inflating an airbag cushion are provided. The chemical coolant formulations include a first ingredient which, when contacted by the hot gas, endothermically decomposes to form a cooling gas and a solid slag component and a second ingredient which, when contacted by the hot gas, forms a liquid slag component. The solid and liquid slag components cooperate to form a unified slag mass.

21 Claims, No Drawings

TREATMENT OF AIRBAG INFLATION GASES

BACKGROUND OF THE INVENTION

This invention relates generally to the treatment of gases and, more particularly, to the treatment, such as by chemical cooling, of gases such as those produced or generated for inflation of inflatable devices such as vehicular inflatable restraint airbag cushions.

It is well known to protect a vehicle occupant using a cushion or bag, e.g., an "airbag cushion," that is inflated or expanded with gas when the vehicle encounters a sudden deceleration, such as in the event of a collision. In such systems, the airbag cushion is normally housed in an uninflated and folded condition to minimize space requirements. Upon actuation of the system, the cushion begins to be inflated, in a matter of no more than a few milliseconds, with gas produced or supplied by a device commonly referred to as "an inflator."

While many types of inflator devices have been disclosed in the art for the inflating of one or more inflatable restraint system airbag cushions, many commonly used inflator devices rely on the combustion of a pyrotechnic, fuel and oxidizer combination or other form of gas generant to produce or at least in part form the inflation gas issuing forth therefrom for use in the inflation of an associated airbag cushion.

Usually, the occurrence of such combustion processing inflator devices has associated therewith the generation or production o f significant quantities of heat.

As will be appreciated, it may be desired or preferred to generally limit the temperature of the inflation gas and which gas may, intentionally or inadvertently, exit from the associated inflatable device, such as either during or subsequent to the inflation thereof.

In general, airbag inflator devices traditionally have not been designed to cool the generated gases to any particularly selected temperature but rather have accepted the temperature inherent to the functional (design of the inflator device and the associated airbag cushion. Thus, it is relatively common that modern airbag inflator devices incorporate a form of mechanical cooling means such as through the conduction of heat into a heat sink, which typically has high thermal conductivity as well as large surface area and mass with which to absorb heat. Thus, it is common for modem inflator devices to include an internal screen pack such as to cool the generated gas and to filter or otherwise remove solid residue remaining from the combustion process. Consequently, the final temperature of the gas from such a device is typically dependent on the gas temperature of the combustion process, the heat transfer to the inflator housing and associated screen or filter materials and the gas expansion into the associated airbag cushion.

Many factors may serve or act to control or limit the amount of cooling which may be realized through the use of such mechanical cooling means. For example, the amount of cooling realizable through such use of a mechanical cooling means will typically be limited by factors such as the length of time the generated gas is in contact with the cooling media as well as the physical properties or parameters, such as mass, surface area, melt temperature, heat capacity and thermal conductivity of the cooling media.

At the present time, sodium azide is a commonly accepted and used gas generating material. While the use of sodium azide meets current industry specifications, guidelines and standards, such use may involve or raise potential concerns such as involving handling, supply and disposal of such materials. As a result, the development and use of other suitable gas generant materials has been pursued. Thus, efforts have been directed to the development of azide-free pyrotechnics for use in such inflator device applications.

At least certain of such azide-free pyrotechnic materials, however, burn at significantly higher temperatures than conventional azide-based pyrotechnics. For example, whereas commonly-used airbag inflator device azide pyrotechnics form gaseous products in a temperature range of about 1400 K to about 1500 K, the gaseous products associated with such azide-free pyrotechnics may more typically be formed at a temperature of about 1700 K to about 2500 K and, more commonly, at a temperature of about 1700 K to about 1900 K. In fact, the higher temperatures associated with such azide-free pyrotechnics are often at or above the melt temperature of many of the mechanical cooling media materials commonly associated with current airbag inflator devices. Consequently, the development and expanded use of more efficient pyrotechnics, such as at least certain azide-free pyrotechnics, has been somewhat limited or hampered by limitations in the abilities of conventional inflator devices and common mechanical cooling media materials to accept such higher combustion temperatures.

Thus, there is a need and a demand for assemblies and processing techniques which can provide an alternative to such mechanical cooling of gases and such as may more easily be adapted for use in conjunction with the cooling of higher temperature gases.

In the past, certain inflator devices have used or attempted to use a form of chemical coolant either alone or in conjunction with mechanical cooling of generated gases. Such chemical cooling has typically relied on the use of one or more endothermically reactable chemical coolant materials with which hot generated gases come into contact such that the hot generated gases are cooled.

The more widespread or increased use of such chemical cooling processing has, however, been generally limited or restricted by factors such as difficulties involved in the handling or processing of such chemical coolant materials and the possible associated formation of undesired chemical cooling by-products such as may be undesirably conveyed into the associated airbag cushion.

Thus, there is a need and a demand for chemical cooling material formulations and associated processing techniques which can permit either or both the more widespread or efficient use of such chemical coolants such as by minimizing or avoiding handling and processing difficulties associated with chemical coolant materials utilized in such applications as well as the handling and processing difficulties related to the products associated with such processing.

SUMMARY OF THE INVENTION

A general object of the invention is to provide an improved chemical cooling material formulation and associated processing techniques such as may result in improved airbag cushion inflation.

A more specific objective of the invention is to overcome one or more of the problems described above.

The general object of the invention can be attained, at least in part, through a specified chemical coolant formulation for treating the hot gas formed by an airbag inflator. In accordance with one embodiment of the invention, such a chemical coolant formulation includes a first coolant ingredient which ingredient, when contacted by the hot gas, endothermically decomposes to form a cooling gas and a solid slag component. The coolant formulation also includes a second coolant ingredient which ingredient, when contacted by the hot gas, forms a liquid slag component. The solid and liquid slag components formed by the chemical coolant formulation cooperate to form a unified slag mass.

The invention also comprehends a method for treating the hot gas formed by an airbag inflator. In accordance with one embodiment of such a method, the method includes the treatment step of contacting the hot gas with a specified chemical coolant formulation. The coolant formulation includes a first ingredient which, when contacted by the hot gas, endothermically decomposes to form a cooling gas and a solid slag component. The coolant formulation further includes a second coolant ingredient which, when contacted by the hot gas, forms a liquid slag component. The solid and liquid slag components cooperate to form a unified slag mass.

The invention further comprehends a method of inflating an airbag cushion wherein a combustible material is burned to form a hot gas wherein such hot gas is contacted with such a specified chemical coolant formulation. In accordance with one such alternative embodiment of the invention, such a method includes the step of contacting the hot gas with a specified chemical coolant formulation. The chemical coolant formulation includes a first coolant ingredient which, when contacted by the hot gas, endothermically decomposes to form a cooling gas and a solid slag component. The chemical coolant formulation also includes a second coolant ingredient which, when contacted by the hot gas, forms a liquid slag component. In operation, the chemical coolant formulation functions such that the solid and liquid slag components cooperate to form a unified slag mass.

The prior art fails to provide as effective and as efficient as desired assemblies and processing techniques which can provide desirable alternatives to mechanical cooling of gases and such as may more easily be adapted for use in conjunction with the cooling of higher temperature gases. More specifically, the prior art fails to provide chemical cooling material formulations and associated processing techniques which can permit either or both the more widespread or efficient use of such chemical coolants such as by minimizing or avoiding handling and processing difficulties associated with chemical coolant materials as well as the handling and processing difficulties related to the products associated with such processing.

Unless otherwise specifically noted, percentages used herein are in terms of weight percent.

Other objects and advantages will be apparent to those skilled in the art from the following detailed description taken in conjunction with the appended claims.

DETAILED DESCRIPTION OF THE INVENTION

The present invention generally provides an improved chemical cooling material formulation and associated processing techniques such as may result in improved airbag cushion inflation. More particularly, such a chemical cooling formulation is particularly suited for use in conjunction with an airbag inflator wherein a combustible material, such as is known in the art, is burned to produce or form a hot gas.

A chemical coolant formulation in accordance with the invention includes a first coolant ingredient which, when contacted by the hot gas, endothermically decomposes to form a cooling gas and a solid slag component. Materials such as metal carbonates, metal hydroxides, hydrated metal salts (i.e., compounds containing chemically bound water) and mixtures thereof can be used as such first coolant ingredient. More specific examples of metal carbonates which can be used in the practice of the invention include: magnesium carbonate, basic magnesium carbonate, basic copper carbonate, calcium carbonate, calcium carbonate/magnesium carbonate (dolomite), and strontium carbonate. Metal hydroxides which may be used in the practice of the invention include magnesium hydroxide and calcium hydroxide. Examples of specific hydrated metals and compounds containing chemically bound water include $MgSO_4.7H_2O$ and $MgCl_2.6H_2O$.

Such materials, when appropriately heated, typically decompose to form or liberate a gas such as either or both carbon dioxide and water. As identified above, such decomposition also results in the formation a solid slag component such as the corresponding metal oxide, for example.

The chemical coolant formulation of the invention also includes a second coolant ingredient, sometimes referred to herein as a "low melting component." Such ingredient, when contacted by the hot gas, forms a liquid slag component. In accordance with one specific embodiment of the invention, such low melting component may take the form of a compound which melts when exposed to heat resulting from the generation of a hot gas within an inflator assembly. Specific examples of such compounds include, alkali metal halogen salts such as KCl, NaCl and LiCl and metal powders having a sufficiently low melting temperature (e.g., metal powders which typically melt at temperatures of less than about 1000 K). As will be appreciated, the normally higher relative costs associated with the use of such metal powders may render the sole or primary use of metal powders for such low melting component economically unattractive.

Alternatively, such low melting component may take the form of a compound whose combustion or pyrolysis product(s) melts when exposed to heat resulting from the generation of a hot gas within an inflator assembly. Specific examples of such compounds include alkali metal carbonates, bicarbonates, chlorates and perchlorates.

The melting associated with the thermal exposure of such second coolant ingredient serves to absorb heat from the hot gas, thereby effecting cooling thereof. Also, the resulting melted (liquid) material desirably cooperates with the solid slag component resulting from the decomposition of the first coolant ingredient to form a unified slag mass. For example, the liquid material may serve as a liquid slag component that sticks, adheres or otherwise serves to join or combine the solid slag component into a mass such as may facilitate the removal of such slag from the output of the associated inflator device. In practice such slag removal can be accomplished through the application of filtering techniques as are known in the art. As will be appreciated the formation of such solid slag components into enlarged or unified mass and the facilitated removal thereof from the output of the inflator can serve to desirably significantly reduce the particulate output associated with corresponding inflator devices.

Such chemical coolant formulations for use in airbag inflator devices can be processed by various appropriate processing techniques. As described in greater detail below, particularly preferred processing techniques for use in association with the subject chemical coolant formulations include extrusion and tableting.

Extruded Coolant Formulation

In extrusion processing, the coolant formulation of the invention is generally prepared and extruded into a selected desired geometric shape. The extruded form is then typically cut to a desired length for use in a particular inflator assembly.

A chemical coolant formulation in accordance with the invention and adapted for use in extrusion processing, in addition to the first and second coolant ingredients such as described above, desirably also contains a binder such as may serve to coat particles composed in the formulation and to desirably hold such particles in intimate contact with each other. The inclusion of such binder may also generally serve to provide the final extruded product with desired strength and rigidity.

Binders for use in chemical coolant formulations in accordance with the invention may be water compatible compounds such as naturally occurring or microbial produced gums, polyacrylamide, polyacrylic acid and salts, copolymers of polyacrylic acids or salts and polyacrylamide, polyvinyl alcohol, hydroxypropyl cellulose, hydroxyethyl cellulose, methyl cellulose and polyvinyl pyrrolidone, for example. The term "water compatible compounds," as used herein relative to binders, is to be understood to generally refer to a compound such as which generally serves to wet other of the formulation components to form a more homogenous gel or mass thereof.

Alternatively, binders compatible with non-water solvents may be used. Examples of such binder materials include: ethyl cellulose, carboxymethyl cellulose, cellulose acetate butyrate, cellulose acetate and other substituted cellulose derivatives.

In general, the use of water compatible binder compounds, such as described above, is preferred as water compatible binder compounds may simplify or reduce certain concerns such as those that may be associated with disposal and safety (e.g., flammability), as compared with the use of binders compatible with non-water solvents.

In addition, a chemical coolant formulation in accordance with the invention and adapted for use in extrusion processing may additionally include or contain one or more oxidizers such as to provide oxygen such as may be desired or required to facilitate combustion of the binder. The amount of oxidizer desired or required for inclusion in a chemical coolant formulation in accordance with the invention adapted for extrusion processing will generally be dependent on the stoichiometry of the reaction undergone thereby and the amount of binder in the formulation.

While the inclusion of an oxidizer might normally be thought necessary in order to ensure proper combustion of the binder, coolant formulations without added oxidizer can be used in accordance with the invention without necessarily detrimentally significantly effecting the resulting gas effluent composition (e.g., effluent levels of either or both carbon monoxide and ammonia). Such avoidance of detrimental impact on gas effluent composition may be due to one or more factors, such as including: the occurrence of significant gas dilution such as related to the large gas generation generally associated in such inflator operation, significant relative amounts of the binder may avoid decomposition and the binder itself may contain or include a significant relative amount of oxygen, for example.

As will be appreciated, the minimization or reduction in the amount of oxidizer required or used desirably permits the incorporation of relatively more of the above-described first and second coolant formulation ingredients. Thus, such minimization or reduction of the amount of oxidizer required or used may permit the use of lesser amounts of chemical coolant and may serve to reduce the size or volume of corresponding inflator designs.

Oxidizers for use in such extrudable chemical coolant formulations include: alkali metal nitrates, chlorates and perchlorates; alkaline earth metal nitrates, chlorates and perchlorates; $CuO$; $Fe_2O_3$; $CoO$; $Co_3O_4$; $V_2O_5$; ammonium nitrate; ammonium perchlorate; basic copper nitrate; and mixtures thereof.

It will be appreciated that extrudable chemical coolant formulations in accordance with the invention may additionally contain or include one or more selected additives. For example, such formulations may include one or more additives to improve properties or characteristics such as strength or thermal conductivity.

The strength of a particular formulation can be important and helpful in particular forms of such a formulation withstanding or otherwise avoiding material deterioration and degradation such as may lead to increased particulate content in the associated effluent gas. Further, the use of formulations and resulting materials having improved or increased strength may reduce or avoid the possibility or likelihood of undesired clumping of the coolant material. As will be appreciated, such clumping can impair contact between the coolant material and the hot gas being treated. In addition, such clumping may lead to undesirable gas flow restrictions such as by plugging corresponding gas flow passages. Additives useful for improving strength include fibrous materials such as composed of graphite, ceramic and metal, for example.

The thermal conductivity of such formulations can be significant as the contact by and between inflator formed or produced hot gas and such coolant materials can be of relatively short duration. Thus, the inclusion of one or more additives to improve thermal conductivity can be desired to better ensure efficient operation. Additives useful for enhancing thermal conductivity include powdered metals and graphite fiber having high thermal conductivity, for example. As will be appreciated, thermal conductivity enhancing metal powders may, as desired, be the same or different from the metal powder used as a low melting component, as described above.

In view of the above, a preferred extrudable chemical coolant formulation in accordance with the invention generally includes: the first coolant ingredient present in a relative amount of about 25 weight percent to about 97 weight percent, the second coolant ingredient present in a relative amount of about 1 weight percent to about 25 weight percent, and the binder present in a relative amount of 2 weight percent to about 10 weight percent. Such extrudable chemical coolant formulation may, if desired, additionally contain an oxidizer such as described above in a relative amount of up to about 60 weight percent. In addition or alternatively, such extrudable chemical coolant formulation may contain one or more additives, such as described above, in a relative amount of up to about 10 weight percent.

In the extrusion processing of such coolant formulations in accordance with the invention, the dry materials can be weighed out in the appropriate amounts and either blended in a V-shell or Forberg type blender or loaded into loss-in-weight feeders for introduction into a selected extruder, such as a twin screw extruder, for example. A separate liquid stream is fed to the extruder to introduce a selected solvent (usually water) into the formulation. Water is commonly and preferably used such as for the reasons generally paralleling those discussed above regarding the general desirability or preference for the use of water compatible binders, e.g., improved or simplified disposal and safety. Water levels of about 10 weight percent to about 15 weight, based on the total weight of the non-water ingredients and the added water, are usually adequate. As the wetted ingredients are processed through the extruder and forced through a die-fitted opening to form the coolant material into a selected desired geometric shape. As will be appreciated, various geometric shapes are possible and may be desirable including, for example, solid and hollow or tubular cylinders. The formed coolant material, as it leaves the die, may in turn be cut to specifically desired lengths. The so formed and cut coolant material may then be appropriately dried such as by means of a convection oven or a fluid bed drier to result in a chemical coolant material suitable for use in airbag inflators such as to cool a hot gas generated in such inflator device. Such drying generally removes "free water," e.g., water that is not chemically bound to one or more formulation ingredient.

Tableted Coolant Formulation

In tableting processing, the formulation is generally prepared and then To shaped and formed into tablet form.

While such tableted coolant formulations may utilize the above-described first and second coolant ingredients, particular of the above-described low melting component materials may also advantageously serve to aid or facilitate tableting such as by assisting to form either or both stronger and more cohesive tablets. In particular, alkali metal halogen salts may serve as tableting aids such as by helping to fuse or bind coolant formulation particles under the application of pressure onto the formulation.

A chemical coolant formulation in accordance with the invention and adapted for use in tableting processing desirably contains, in addition to first and second coolant ingredients as described above, a release aid such as may function to lubricate the surface of the tablets prepared from such formulation or otherwise facilitate the removal by ejection or otherwise such as a punch of a tablet press.

Release aids for use in chemical coolant formulations in accordance with the invention include: calcium stearate, mica, molybdenum disulfide, lubricant grade graphite powder and combinations thereof, for example. In particular, the use of a combination of calcium stearate and mica, such as in equal weight amounts, has been found to be particularly attractive.

In addition, such tableted coolant formulations in accordance with the invention may additionally contain or include one or more selected additives, such as described above, to improve properties or characteristics such as strength or thermal conductivity.

In view of the above, a preferred chemical coolant formulation in accordance with the invention for processing in tableted form generally includes: the first coolant ingredient in a relative amount of about 63 weight percent to about 98.5 weight percent, the second coolant ingredient in a relative amount of about 1 weight percent to about 25 weight percent, a release aid in a relative amount of about 0.5 weight percent to about 2 weight percent. Such chemical coolant formulation adapted for processing in tableted form may, if desired, additionally include at least one additive, such as described above, in a relative amount of up to about 10 weight percent.

In the tableting processing of such coolant formulations in accordance with the invention, the dry materials can be weighed out in the appropriate amounts and mixed with water (typically between about 15 weight percent to about 30 weight percent, based on the total weight of the non-water ingredients and the added water) to obtain a slurry. The slurry may then be processed such as by being pumped through a spray drier system to obtain dried spherical particles that flow well and are easily processed through a high speed tablet press such as to form tablets. Such table presses are commonly utilized in pharmaceutical industry. Tablet diameters of 0.125 inches to 0.25 inches are common. The so formed chemical coolant material tablets are suitable for use in airbag inflators such as to cool a hot gas generated in such inflator device.

While the invention has been described above with specific reference to the chemical cooling treatment of gases such as those produced or generated for inflation of inflatable devices such as vehicular inflatable restraint airbag cushions, the use of such chemical coolant formulation may additionally or alternatively act or serve to treat such gases such as by removing or filtering particulate therefrom. Such particulate removal or filtering treatment may occur as particulate material in the gas flow may contact the coolant material, resulting in particulate material depositing on or otherwise being trapped by the coolant material.

The present invention is described in further detail in connection with the following examples which illustrate or simulate various aspects involved in the practice of the invention. It is to be understood that all changes that come within the spirit of the invention are desired to be protected and thus the invention is not to be construed as limited by these examples.

EXAMPLES

Extruded Chemical Coolant Formulations— Examples 1–4

The following formulations were processed to form extruded chemical coolant materials in accordance with the invention:

Example 1

| | |
|---|---|
| 75.0 wt.% | basic magnesium carbonate ($Mg_2(OH)_2CO_3$) |
| 10.0 wt.% | KCl |
| 10.0 wt.% | calcium carbonate/magnesium carbonate (dolomite) |
| 5.0 wt.% | sodium polyacrylate polyacrylamide copolymer, composed of 90 weight percent sodium polyacrylate and 10 weight percent polyacrylamide |

Example 2

| | |
|---|---|
| 60.0 wt.% | $MgSO_4 \cdot 7H_2O$ |
| 25.0 wt.% | calcium carbonate/magnesium carbonate (dolomite) |
| 10.0 wt.% | KCl |
| 5.0 wt.% | sodium polyacrylate polyacrylamide copolymer, as used in Example 1 |

Example 3

| | |
|---|---|
| 60.0 wt.% | $MgCO_3$ |
| 30.0 wt.% | basic copper carbonate ($Cu_2(OH)_2CO_3$) |
| 5.0 wt.% | copper metal powder, −325 mesh |
| 5.0 wt.% | sodium polyacrylate polyacrylamide copolymer, as used in Example 1 |

Example 4

| | |
|---|---|
| 80.92 wt.% | calcium carbonate/magnesium carbonate (dolomite) |
| 14.88 wt.% | $KClO_4$ |
| 0.40 wt.% | guar gum |
| 3.80 wt.% | polyacrylamide |

Tableted Chemical Coolant Formulations—Examples 5–7

The following formulations were processed to form tableted chemical coolant materials in accordance with the invention:

Example 5

84.16 wt.% $MgCO_3$
14.84 wt.% KCl
0.50 wt.% calcium stearate
0.50 wt.% mica

Example 6

70.5 wt.% basic magnesium carbonate ($Mg_2(OH)_2CO_3$)
23.5 wt.% $KHCO_3$
5.0 wt.% high thermal conductivity graphite fibers
1.0 wt.% lubricant grade graphite powder

Example 7

74.0 wt.% $MgCO_3$
20.0 wt.% $KHCO_3$
5.0 wt.% aluminum metal powder, −100 mesh (thermal conductivity enhancer)
0.5 wt.% calcium stearate
0.5 wt.% mica Procedure Each of the chemical coolant formulations of Examples 1–7 was respectively loaded into a test fixture resembling an inflatable restraint system airbag inflator. In each case, 30 grams of a gas generant was loaded in the test fixture, with the same gas generant formulation used in each instance. The coolant was loaded into the test fixture in a volumetric manner. The mass of coolant ($M_c$) used in each case is identified in TABLE below, with the coolant mass varying dependent on the density and geometry thereof.

In each case, the test fixture was deployed into a 60 liter-closed tank. Both the pressure ($P_t$) and the temperature ($T_t$) within the tank were measured. In addition, a sample of the effluent gas was analyzed by infrared spectroscopy to determine the composition thereof.

After deployment, the test tank was washed out and the wash water collected and evaporated. The remaining solids were then weighed to determine a residue weight ($W_r$).

In addition, two comparative runs were made both utilizing the test fixture similarly loaded with 30 grams of the same gas generant formulation. In the first comparative run, the test inflator was operated without coolant in the coolant chamber, i.e., the coolant chamber was empty. In the other comparative run, the coolant chamber contained 15 grams of metal screen for comparison cooling purposes.

TABLE

| Coolant | $M_c$(g) | $P_t$(psi) | $T_t$(° F.) | $W_r$(mg) | $CO_2$(ppm) |
|---|---|---|---|---|---|
| None | N/A | 32.4 | 788 | 1145 | 18,167 |
| Metal Screen | 15.0 | 27.9 | 611 | 535 | 18,333 |
| Example 1 | 14.3 | 26.5 | 528 | 1023 | 28,500 |
| Example 2 | 20.4 | 25.6 | 474 | 1231 | 23,033 |
| Example 3 | 32.2 | 23.8 | 496 | 1888 | 28,400 |
| Example 4 | 18.37 | 29.4 | 694 | 2568 | 45,200 |
| Example 5 | 36.35 | 23.5 | 438 | 1265 | 22,600 |
| Example 6 | 15.0 | 29.3 | 551 | 744 | 27,225 |
| Example 7 | 15.0 | 27.7 | 528 | 2008 | 33,833 |

Discussion of Results

The increased $CO_2$ levels realized in each of Examples 1–7 evidence the reaction, e.g., decomposition, of the respective coolant formulations. Each of Examples 1–7 also evidenced cooling of the effluent gas, as shown by the reduction in tank temperature realized in each of these Examples. In particular, each of Examples 1–3 and 5–7 exhibited tank temperatures significantly below the tank temperatures in each of the comparative runs. Further, while each of Examples 1–7 exhibited tank pressures which were reduced as compared to the baseline comparison without coolant, the tank pressures were generally similar to those obtain in the comparative run made with the metal screen, with Examples 4 and 6 exhibiting increased tank pressures as compared to the run with metal screen.

While Examples 3, 4 and 7 each produced a residue weight greater than the comparative run made without coolant, both Examples 2 and 5 provided residue weights comparable to that of the comparative run made without coolant and Examples 1 and 6 provided residue weights below that obtained in the comparative run made without coolant.

In view of the above, the desirability of and potential for the use of the chemical coolant formulations of the invention is believed apparent to those skilled in the art.

As will be appreciated, the above-described invention may significantly and dramatically facilitate the handling or processing associated with the use of chemical coolants. In addition, the above-described invention can reduce or avoid problems such as those related to the formation of undesired chemical cooling by-products such as may be undesirably conveyed into the associated airbag cushion and such as have generally hampered a more widespread application of chemical coolants with airbag inflators.

Further, chemical coolant formulations in accordance with the invention may more freely permit or allow the use of pyrotechnic formulations such as may exhibit higher or elevated burn temperatures, such as compared to standard or typical azide-based pyrotechnics. For example, the chemical coolant formulations of the invention may more easily permit or facilitate the use of pyrotechnic materials which burn at temperatures significantly higher than about 1500 K. In particular, the coolant formulations of the invention may better permit or allow the use of gas generants which produce or form gaseous products at temperatures in the range of about 1700 K to about 2500 K and, more particularly, at a temperature in the range of about 1700 K to about 1900 K, such as may be associated with certain azide-free pyrotechnic materials.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A chemical coolant formulation for treating the hot gas formed by an airbag inflator, said chemical coolant formulation comprising:
    a first coolant ingredient which, when contacted by the hot gas, endothermically decomposes to form a cooling gas and t solid slag component,
    a second coolant ingredient which, when contacted by the hot gas, forms a liquid slag component,
    wherein the solid and liquid slag components cooperate to form a unified slag mass and
    a binder effective to render the formulation extrudable, wherein said binder is a water compatible compound.

2. The chemical coolant formulation of claim 1 wherein said binder is selected from the group consisting of naturally occurring gums; microbial produced gums, polyacrylamide, polyacrylic acid and salts, copolymers of polyacrylic acids and polyacrylamide, copolymers of polyacrylic salts and polyacrylamide, polyvinyl alcohol, hydroxypropyl cellulose, hydroxyethyl cellulose, methyl cellulose and polyvinyl pyrrolidone.

3. The chemical coolant material of claim 1 additionally comprising an oxidizer present in a relative amount of up to about 60 weight percent.

4. The chemical coolant material of claim 3 wherein said oxidizer is selected from the group consisting of: alkali metal nitrates, chlorates and perchlorates; alkaline earth metal nitrates, chlorates and perchlorates; CuO; $Fe_2O_3$; CoO; $Co_3O_4$; $V_2O_5$; ammonium nitrate; ammonium perchlorate; basic copper nitrate; and mixtures thereof.

5. A chemical coolant formulation for treating the hot gas formed by an airbag inflator, said chemical coolant formulation comprising:
    a first coolant ingredient which, when contacted by the hot gas, endothermically decomposes to form a cooling gas and a solid slag component,
    a second coolant ingredient which, when contacted by the hot gas, forms a liquid slag component,
    wherein the solid and liquid slag components cooperate to form a unified slag mass and
    a binder effective to render the formulation extrudable, wherein said binder is selected from the group consisting of: ethyl cellulose, carboxymethyl cellulose, cellulose acetate butyrate, cellulose acetate and other substituted cellulose derivatives.

6. A method for forming a chemical coolant, said method comprising:
    extrusion processing of a coolant formulation including:
        a first coolant ingredient which, when contacted by the hot gas, endothermically decomposes to form a cooling gas and a solid slag component,
        a second coolant ingredient which, when contacted by the hot gas, forms a liquid slag component, and
        a binder effective to render the formulation extrudable,
    wherein the solid and liquid slag components cooperate to form a unified slag mass.

7. An extruded chemical coolant formulation for treating the hot gas formed by an airbag inflator, said extruded chemical coolant formulation comprising:
    a first coolant ingredient which, when contacted by the hot gas, endothermically decomposes to form a cooling gas and a solid slag component,
    a second coolant ingredient which, when contacted by the hot gas, forms a liquid slag component, and
    a binder effective to render the formulation extrudable,
    wherein the solid and liquid slag components cooperate to form a unified slag mass.

8. The extruded chemical coolant formulation of claim 7 wherein said first coolant ingredient is selected from the group consisting of metal carbonates, metal hydroxides, hydrated metal salts and mixtures thereof.

9. The extruded chemical coolant formulation of claim 7 wherein said second coolant ingredient comprises at least one alkali metal halogen salt.

10. The extruded chemical coolant formulation of claim 7 wherein said second coolant ingredient comprises a metal powder having a melting temperature of less than about 1000 K.

11. The extruded chemical coolant formulation of claim 7 wherein said second coolant ingredient comprises at least one alkali metal compound selected from the group of carbonates, bicarbonates, chlorates and perchlorates.

12. The extruded chemical coolant formulation of claim 7 wherein said binder is compatible with non-water solvents.

13. An extruded chemical coolant material comprising the chemical coolant formulation of claim 7, wherein the extruded material includes:
    the first coolant ingredient present in a relative amount of about 25 weight percent to about 97 weight percent,
    the second coolant ingredient present in a relative amount of about 1 weight percent to about 25 weight percent, and
    the binder present in a relative amount of 2 weight percent to about 10 weight percent.

14. The extruded chemical coolant material of claim 13 additionally comprising at least one additive to improve the thermal conductivity of the extruded material, said additive present in a relative amount of up to about 10 weight percent.

15. The extruded chemical coolant material of claim 13 additionally comprising an oxidizer present in a relative amount of up to about 60 weight percent.

16. The extruded chemical coolant material of claim 15 wherein said oxidizer is selected from the group consisting of: alkali metal nitrates, chlorates and perchlorates; alkaline earth metal nitrates, chlorates and perchlorates; CuO; $Fe_2O_3$; CoO; $Co_3O_4$; $V_2O_5$; ammonium nitrate; ammonium perchlorate; basic copper nitrate; and mixtures thereof.

17. A method for forming a chemical coolant, said method comprising:
    tableting processing of a coolant formulation including:
        a first coolant ingredient which, when contacted by the hot gas, endothermically decomposes to form a cooling gas and a solid slag component,
        a second coolant ingredient which, when contacted by the hot gas, forms a liquid slag component, and
        a release aid effective to permit the release of the tableted material from a corresponding tablet forming device, the release aid present in a relative amount of about 0.5 weight percent to about 2 weight percent,
    wherein the solid and liquid slag components cooperate to form a unified slag mass.

18. A tableted chemical coolant material for treating the hot gas formed by an airbag inflator, said tableted chemical coolant material comprising a first coolant ingredient which, when contacted by the hot gas, endothermically decomposes to form a cooling gas and a solid slat component, said first coolant ingredient present in a relative amount of about 63 weight percent to about 98.5 weight percent, a second coolant ingredient which when contacted by the hot gas, forms a liquid slat component, and wherein the solid and liquid slag components cooperate to form a unified slag mass, said second cooling ingredient present in a relative amount of about 1 weight percent to about 25 weight percent, and a release aid effective to permit the release of the tableted material from a corresponding tablet forming device, said release aid present in a relative amount of about 0.5 weight percent to about 2 weight percent.

19. The tableted chemical coolant material of claim 18 wherein said release aid is selected from the group consisting of: calcium stearate, mica, molybdenum disulfide, lubricant grade graphite powder and combinations thereof.

20. The tableted chemical coolant material of claim 18 additionally comprising:

at least one additive to improve the thermal conductivity of the tableted material, said additive present in a relative amount of up to about 10 weight percent.

21. A tableted chemical coolant material for treating the hot gas formed by an airbag inflator, said tableted chemical coolant material comprising:

a first coolant ingredient which, when contacted by the hot gas, endothermically decomposes to form a cooling gas and a solid slag component, said first coolant ingredient present in a relative amount of about 63 weight percent to about 98.5 weight percent, a second coolant ingredient which, when contacted by the hot gas, forms a liquid slag component, and wherein the solid and liquid slag components cooperate to form a unified slag mass, said second cooling ingredient present in a relative amount of about 1 weight percent to about 25 weight percent, and a release aid effective to permit the release of the tableted material from a corresponding tablet forming device, said release aid present in a relative amount of about 0.5 weight percent to about 2 weight percent, wherein said release aid is a combination of calcium stearate and mica.

* * * * *